United States Patent
Chalou et al.

(10) Patent No.: US 8,968,061 B2
(45) Date of Patent: Mar. 3, 2015

(54) CONTAINMENT HOOD

(75) Inventors: Dennis N. Chalou, Metamora, MI (US); Roger C. McCallum, Sterling Heights, MI (US); Jason D. Gabel, Commerce, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 866 days.

(21) Appl. No.: 13/195,257

(22) Filed: Aug. 1, 2011

(65) Prior Publication Data

US 2013/0035025 A1    Feb. 7, 2013

(51) Int. Cl.
| | |
|---|---|
| *B08B 15/02* | (2006.01) |
| *F23J 11/02* | (2006.01) |
| *F24C 15/20* | (2006.01) |
| *F24F 7/00* | (2006.01) |
| *F24F 11/00* | (2006.01) |
| *F24F 13/00* | (2006.01) |

(52) U.S. Cl.
CPC ............... *B08B 15/02* (2013.01); *B08B 15/023* (2013.01)
USPC .............................. 454/61; 454/63; 55/385.2

(58) Field of Classification Search
CPC ...... B08B 15/00; B08B 15/02; B08B 15/002; B08B 15/023
USPC ........................... 454/49, 56, 61, 63; 55/385.2
See application file for complete search history.

(56) References Cited

U.S. PATENT DOCUMENTS

| | | | | |
|---|---|---|---|---|
| 3,041,957 | A * | 7/1962 | Liptay ............................... | 454/56 |
| 3,824,912 | A * | 7/1974 | Jensen et al. ..................... | 454/50 |
| 4,514,936 | A * | 5/1985 | Hurtado ........................... | 451/28 |
| 4,590,847 | A * | 5/1986 | Hull .................................. | 454/57 |
| 4,632,022 | A * | 12/1986 | Baitinger et al. ................ | 454/56 |
| 4,928,348 | A | 5/1990 | Clayton | |
| 5,056,422 | A * | 10/1991 | Horntvedt ........................ | 454/57 |
| 5,083,558 | A * | 1/1992 | Thomas et al. ........... | 128/202.12 |
| 5,336,128 | A * | 8/1994 | Birdsong .......................... | 454/56 |
| 5,348,697 | A * | 9/1994 | Palmers et al. ................ | 264/102 |
| 5,487,768 | A * | 1/1996 | Zytka et al. .................... | 55/385.2 |
| 5,597,589 | A | 1/1997 | Deckard | |
| 5,630,435 | A * | 5/1997 | Brouchoud et al. ............ | 134/68 |
| 5,632,579 | A | 5/1997 | Susnjara | |
| 5,928,075 | A * | 7/1999 | Miya et al. ....................... | 454/56 |
| 5,992,276 | A * | 11/1999 | Sullivan .......................... | 82/112 |
| 6,010,400 | A * | 1/2000 | Krainiak et al. ............... | 454/187 |
| 6,116,249 | A * | 9/2000 | Tuffery .......................... | 132/200 |
| 6,338,675 | B2 * | 1/2002 | Winkelman ..................... | 454/56 |
| 6,428,408 | B1 | 8/2002 | Bell et al. | |
| 6,517,429 | B1 * | 2/2003 | O'Connell et al. ............. | 454/56 |
| 6,708,697 | B1 * | 3/2004 | Ziff ................................. | 132/73 |
| 6,866,717 | B2 * | 3/2005 | Shutic et al. .................. | 118/309 |
| 6,968,993 | B1 * | 11/2005 | Russell .......................... | 232/17 |
| 7,261,541 | B2 | 8/2007 | Fong | |

(Continued)

*Primary Examiner* — Steven B McAllister
*Assistant Examiner* — Jonathan Cotov

(57) ABSTRACT

A containment hood may include a first shell portion, a second shell portion and a lid portion. The first shell portion may include a first interior-facing surface. The second shell portion may be spaced apart from the first shell portion and may include a second interior-facing surface. The first and second interior-facing surfaces may oppose each other. The lid portion may extend between and engage the first and second shell portions. The lid portion may cooperate with the first and second shell portions to form at least a partial enclosure defining an interior volume. The first and second shell portions and the lid portion may cooperate to define a first opening through which a user is able to access the interior volume.

14 Claims, 6 Drawing Sheets

(56) References Cited

U.S. PATENT DOCUMENTS

| | | |
|---|---|---|
| 7,381,127 B2 * | 6/2008 | Price .............................. 454/56 |
| 7,393,373 B1 * | 7/2008 | Krippner et al. ............. 55/385.2 |
| 8,038,515 B2 * | 10/2011 | Livchak et al. ................. 454/67 |
| 2010/0029189 A1 * | 2/2010 | Wood .............................. 454/76 |
| 2013/0161442 A1 * | 6/2013 | Mannella et al. ............. 242/598 |

* cited by examiner

CONTAINMENT HOOD

FIELD

The present disclosure relates to an apparatus for containing particulate matter, and more particularly to a containment hood.

BACKGROUND

Many conventional manufacturing processes, such as casting extruding and molding, for example, require expensive tools, dies and/or other equipment. Accordingly, such processes can be quite expensive for production of a single prototype component or low-volume production. Selective laser sintering (SLS) can be a cost-effective manufacturing process for low-volume production of components having complex three-dimensional shapes.

SLS is a manufacturing technique that includes using a laser to fuse or sinter particles of plastic powder (or other material) together to form a desired shaped component. The laser scans a block of powder material (e.g., nylon or other polymeric material), sintering one thin cross-sectional layer of the powder material at a time until the entire shape of the component has been formed into the block of material. Once the sintering is complete, the formed block of material includes sintered powder in the shape of the component being produced surrounded by unsintered powder. Thereafter, the block of material may be cooled on a "breakout" table or "unpacking" module, and the unsintered powder may be removed from the sintered material. Removing the unsintered powder (or "breaking out" the sintered component) can result in unsintered powder being spilled on the floor and/or unsintered powder becoming airborne.

SUMMARY

The present disclosure provides a containment hood that may include a first shell portion, a second shell portion and a lid portion. The first shell portion may include a first interior-facing surface. The second shell portion may be spaced apart from the first shell portion and may include a second interior-facing surface. The first and second interior-facing surfaces may oppose each other. The lid portion may extend between and engage the first and second shell portions. The lid portion may cooperate with the first and second shell portions to form at least a partial enclosure defining an interior volume. The first and second shell portions and the lid portion may cooperate to define a first opening through which a user is able to access the interior volume.

In another form, the present disclosure provides an apparatus that may include a breakout table and a containment hood. The breakout table may be associated with a selective sintering machine and may include a cooling surface. The cooling surface may be configured to support a block of material after the block is subjected to a sintering operation. The containment hood may be mounted to the breakout table and at least partially encloses the cooling surface. The containment hood may include an evacuation opening and an access opening. The evacuation opening may be configured to engage a vacuum device. The access opening may allow a user to access the cooling surface to allow the user to remove unsintered powder from a sintered portion of the block of material.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
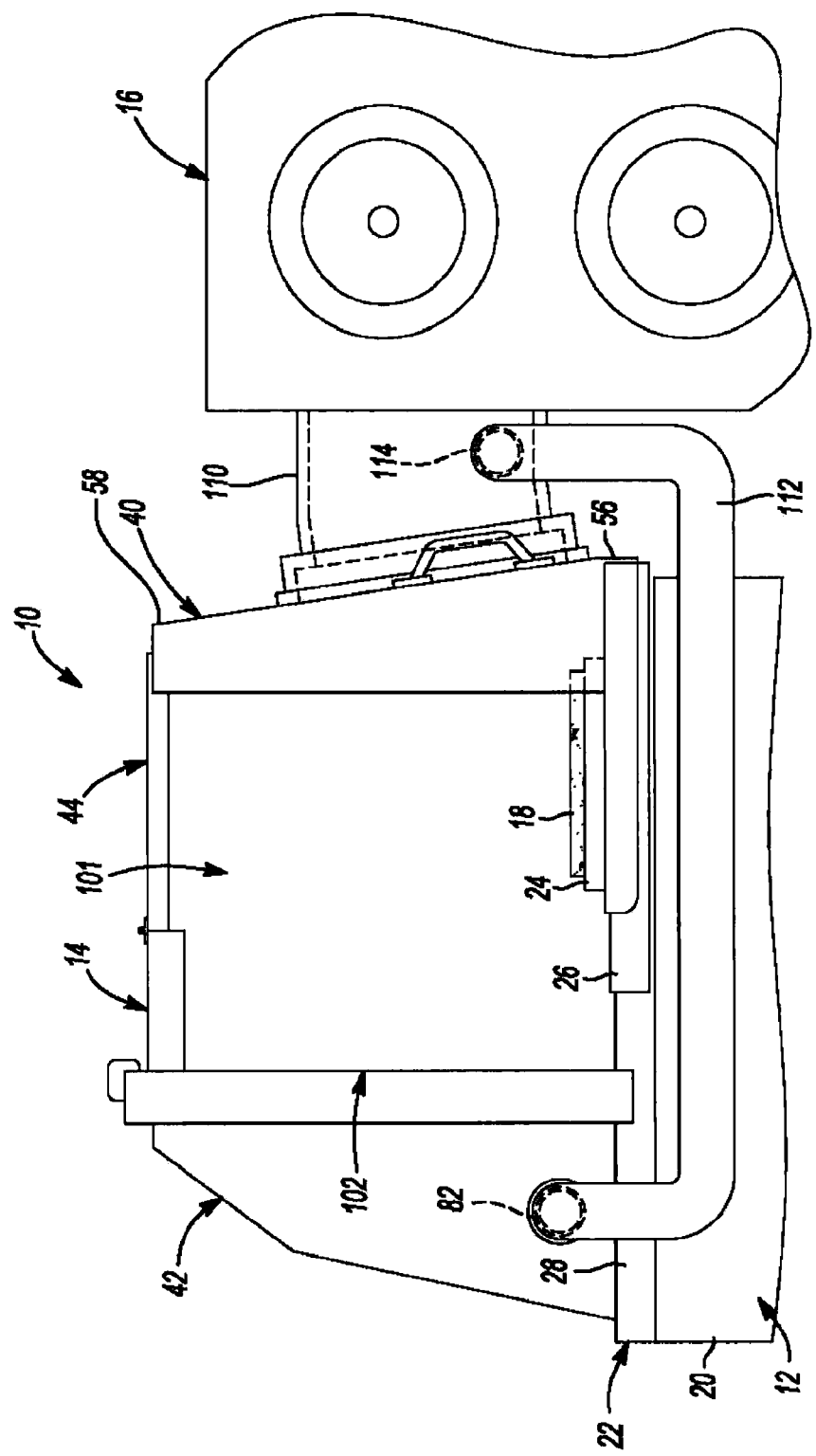
FIG. 1 is a partial side view of a system including a containment hood according to the principles of the present disclosure.
Figure 2:
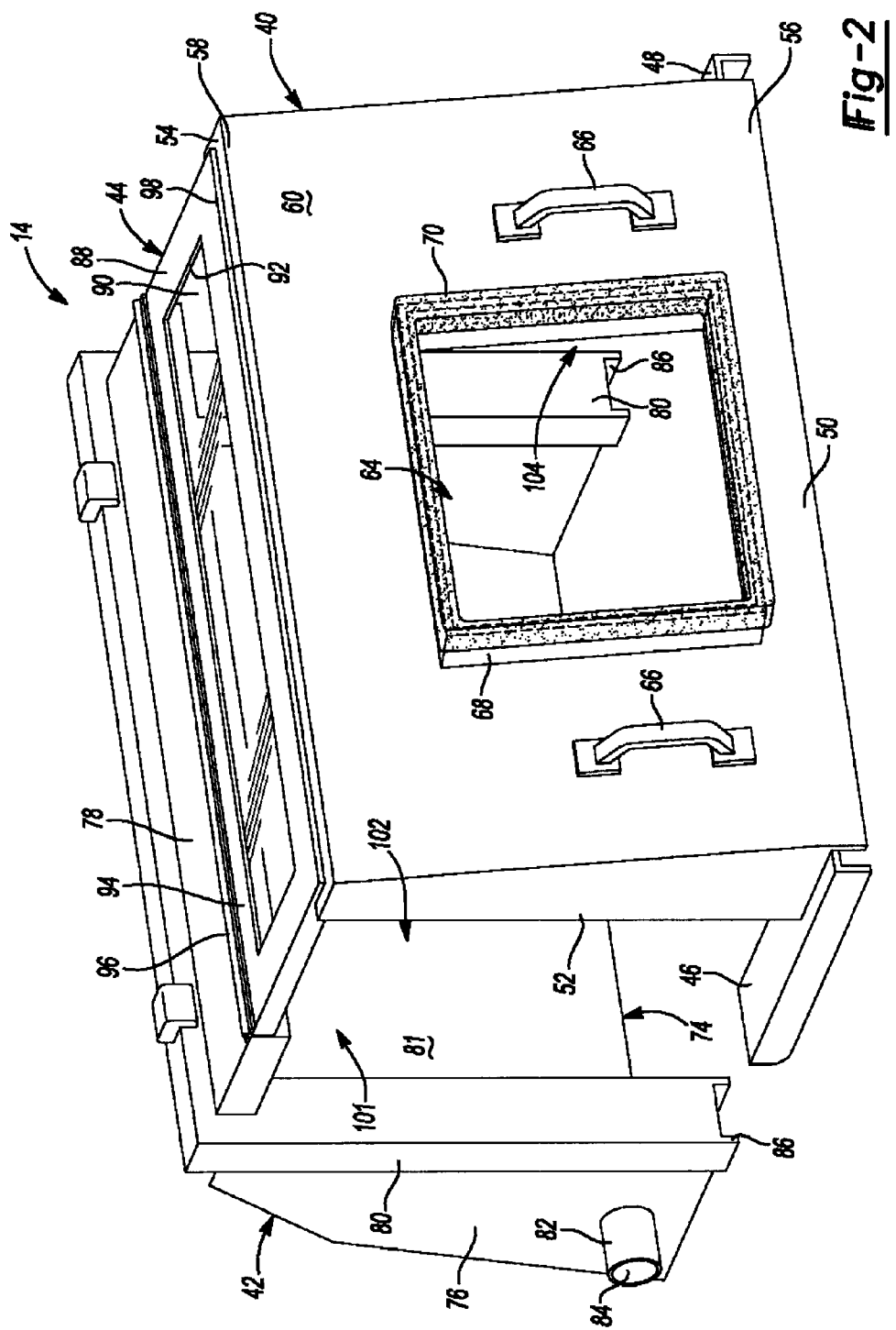
FIG. 2 is a perspective view of the containment hood of FIG. 1.
Figure 3:
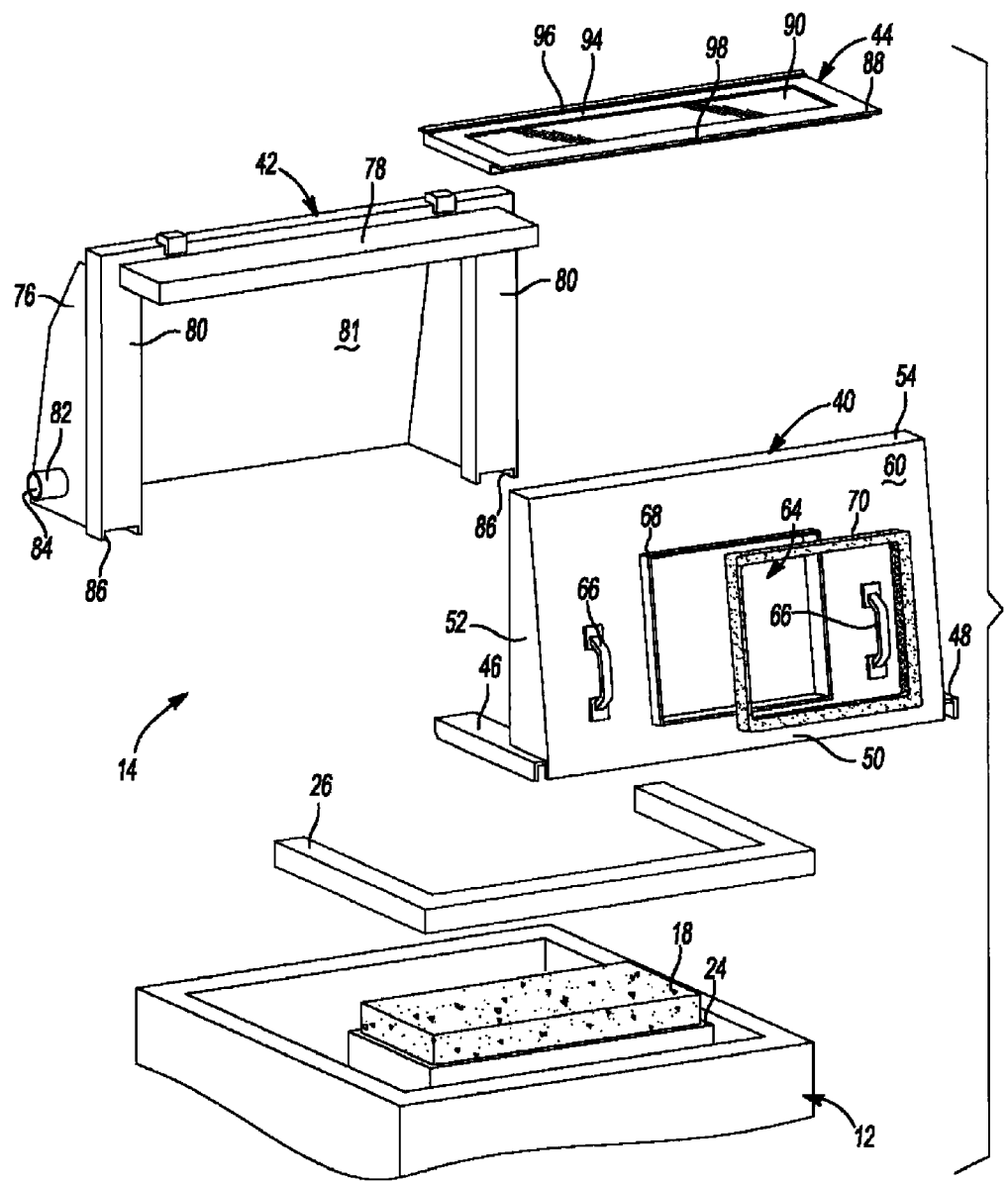
FIG. 3 is an exploded perspective view of the containment hood and a breakout table according to the principles of the present disclosure.
Figure 4:
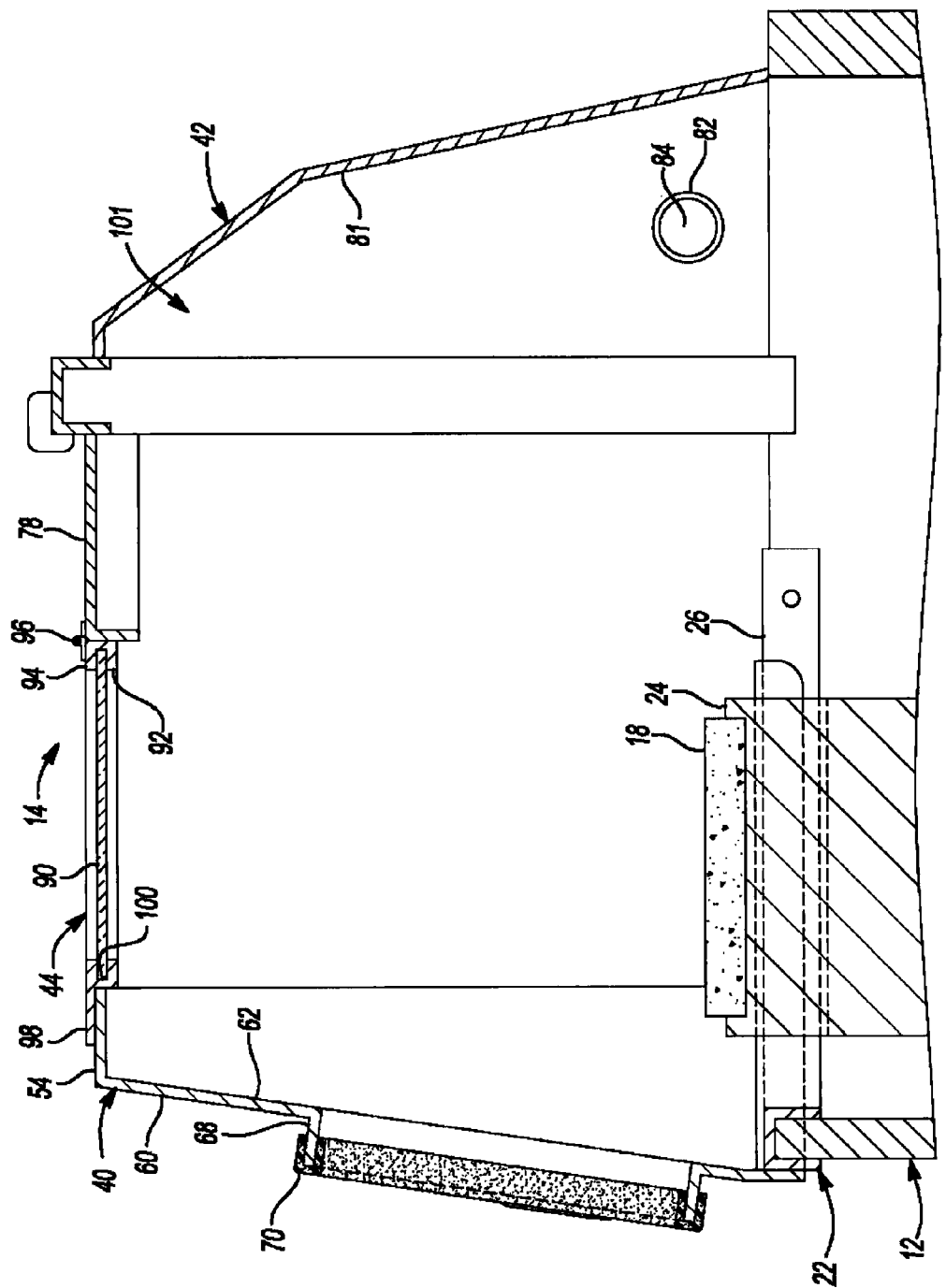
FIG. 4 is a partial cross-sectional view of the containment hood and breakout table.

With reference to FIGS. 1-6, a system 10 is provided and may include a production station 12 having a containment hood 14 mounted thereto. The containment hood 14 may be connected to a vacuum device 16. The containment hood 14 may be operable to at least partially contain matter such as powder, dust or other particulate matter, and/or any other liquid, solid and/or gas therein. The containment hood 14 may cooperate with the vacuum device 16 to inhibit or prevent such matter from spreading onto a floor or into the ambient air proximate the production station 12, for example.

The production station 12 can be any type of table, machine or station at which any sort of fabrication, machining, manufacturing operation or step, and/or other work or production may be conducted. For example, the production station 12 can include a "breakout table" or "unpacking module" associated with a selective laser sintering machine (not shown), for example. In some embodiments, the production station 12 may be or include a "P7 unpacking module" manufactured by EOS GmbH. In such an embodiment, the production station 12 may be a station at which a block of polymeric, metallic or other material 18 may be positioned for cooling after undergoing a selective laser sintering fabrication operation in the selective laser sintering machine.

In some embodiments, the production station 12 may include a base 20, a rim 22 and a cooling surface 24. The rim 22 may be disposed on a perimeter of the base 20 and may surround the cooling surface 24. The rim 22 may include a first portion 26 and a second portion 28. The first portion 26 may be pivotable relative to the second portion 28 and the cooling surface 24 between a closed position (shown in FIGS. 1, 4 and 5) and an open position (shown in FIG. 6). The block of material 18 may include unsintered powder disposed on, within and/or around sintered powder in the shape of a product or component formed as a result of a selective sintering process. The cooling surface 24 may be configured to support the block of material 18 while it cools and/or during a "breakout" process in which one or more users or workers may be positioned proximate to the production station 12 to remove the unsintered powder from the block of material 18.

The containment hood 14 may include a first shell portion 40, a second shell portion 42 and a lid portion 44. The first shell portion 40 may be formed from aluminum, steel or any other metal plate-stock or sheet-stock, for example, and may include first and second mounting legs 46, 48, a first member 50, a pair of opposing first side members 52, and a first top member 54. The first and second mounting legs 46, 48 may be welded, bolted or otherwise fastened to a corresponding one of the first side member 52 and the first member 50. The first and second mounting legs 46, 48 may include a generally U-shaped cross section and may slidably engage the first portion 26 of the rim 22 of the production station 12.

The first member 50 may be substantially perpendicular to the first side members 52. The first side members 52 may be substantially perpendicular to the first top member 54. The first member 50 may include a lower end 56, an upper end 58, an exterior-facing surface 60, an interior-facing surface 62 and an evacuation opening 64. The lower end 56 of the first member 50 may be substantially perpendicular to the first top member 54 and may abut the first portion 26 of the rim 22. The upper end 58 may be adjacent the first top member 54. One or more handles 66 may be welded or bolted to the exterior-facing surface 60. In some embodiments, the members 50-54 may be formed from discrete pieces of material and may be welded or bolted together to form the first shell portion 40. In other embodiments, some or all of the members 50-54 may be formed from a single unitary piece of material that is formed into the shape of the first shell portion 40 illustrated in the figures. The evacuation opening 64 may extend through the exterior-facing surface 60 and the interior-facing surface 62. A rim 68 may surround the evacuation opening 64 and may extend outward from the exterior-facing surface 62. An elastomeric gasket 70 may engage the rim 68. In an exemplary embodiment, the gasket 70 may surround the opening 64 such that the opening 64 remains open to receive a portion of the vacuum device 16. In other embodiments a removable cover may be employed so that when the cover is removed the vacuum device 16 can be engaged with the opening 64, rim 68 and gasket 70.

The second shell portion 42 may be formed from aluminum, steel or any other metal plate-stock or sheet-stock, for example, and may include a second member 74, a pair of opposing second side members 76, a second top member 78 and a pair of support members 80. The second member 74 may be substantially perpendicular to the second side members 76 and may include an interior-facing surface 81 that generally faces the interior-facing surface 62 of the first member 50. The second side members 76 may be substantially perpendicular to the second top member 78. An evacuation port 82 may extend outward from one of the second side members 76. An aperture 84 extends through the evacuation port 82 and the corresponding second side member 76. Each of the support members 80 may extend downwardly (relative to the views shown in the figures) from the second top member 78 adjacent a corresponding one of the second side members 76. Each of the support members 80 may include generally U-shaped feet 86 that may engage the second portion 28 of the rim 22 of the production station 12. In some embodiments, the members 74-80 may be formed from discrete pieces of material and may be welded or bolted together to form the second shell portion 42. In other embodiments, some or all of the members 74-80 may be formed from a single unitary piece of material that is formed into the shape of the second shell portion 42 illustrated in the figures.

While the first and second shell portions 40, 42 are described above as being formed from a metallic material, in some embodiments, the first and/or second shell portions 40, 42 may be formed from a polymeric material or cardboard, for example, or any other suitable material or combinations thereof.

Figure 5:
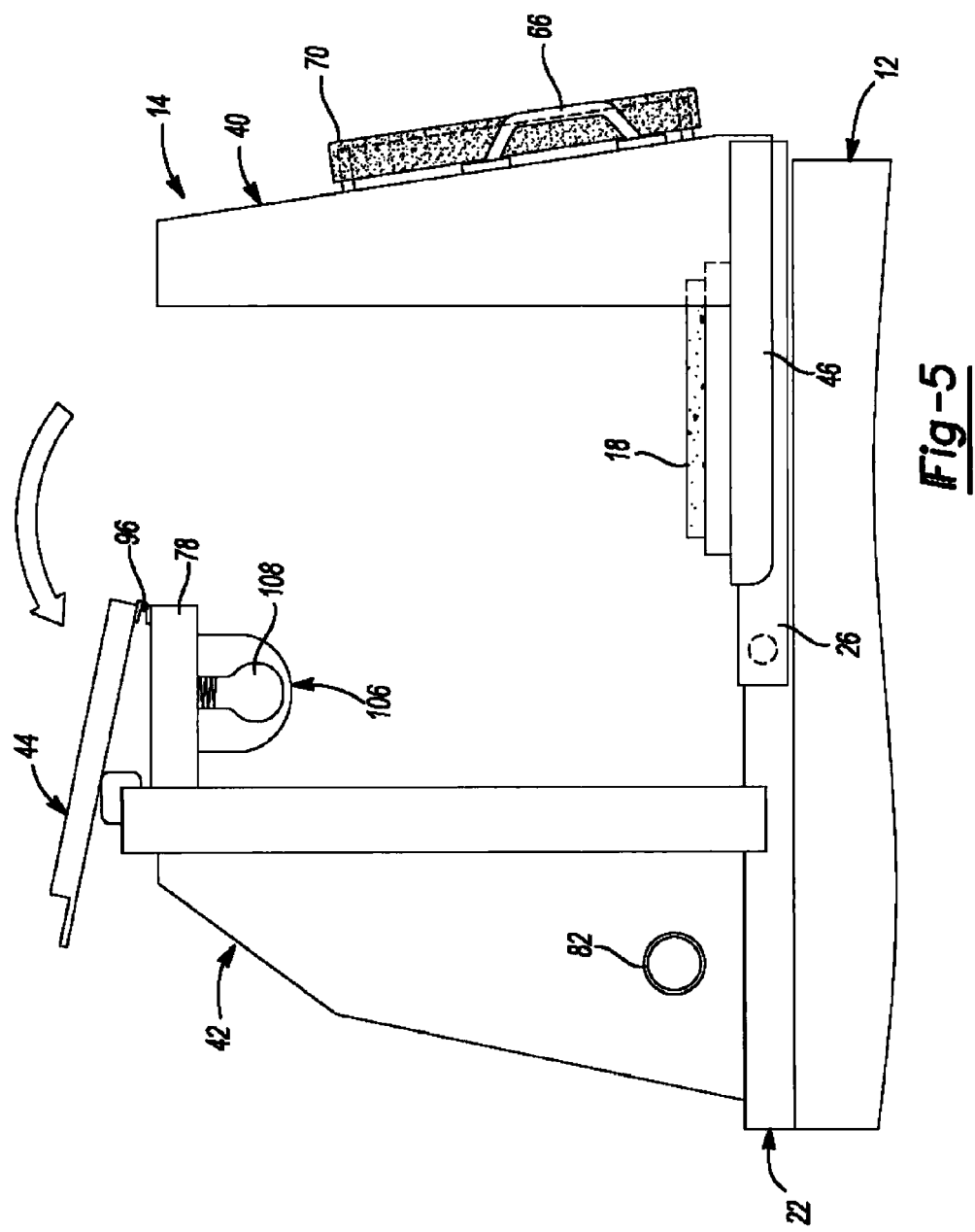
FIG. 5 is a side view of the containment hood including a lid in an open position.
Figure 6:
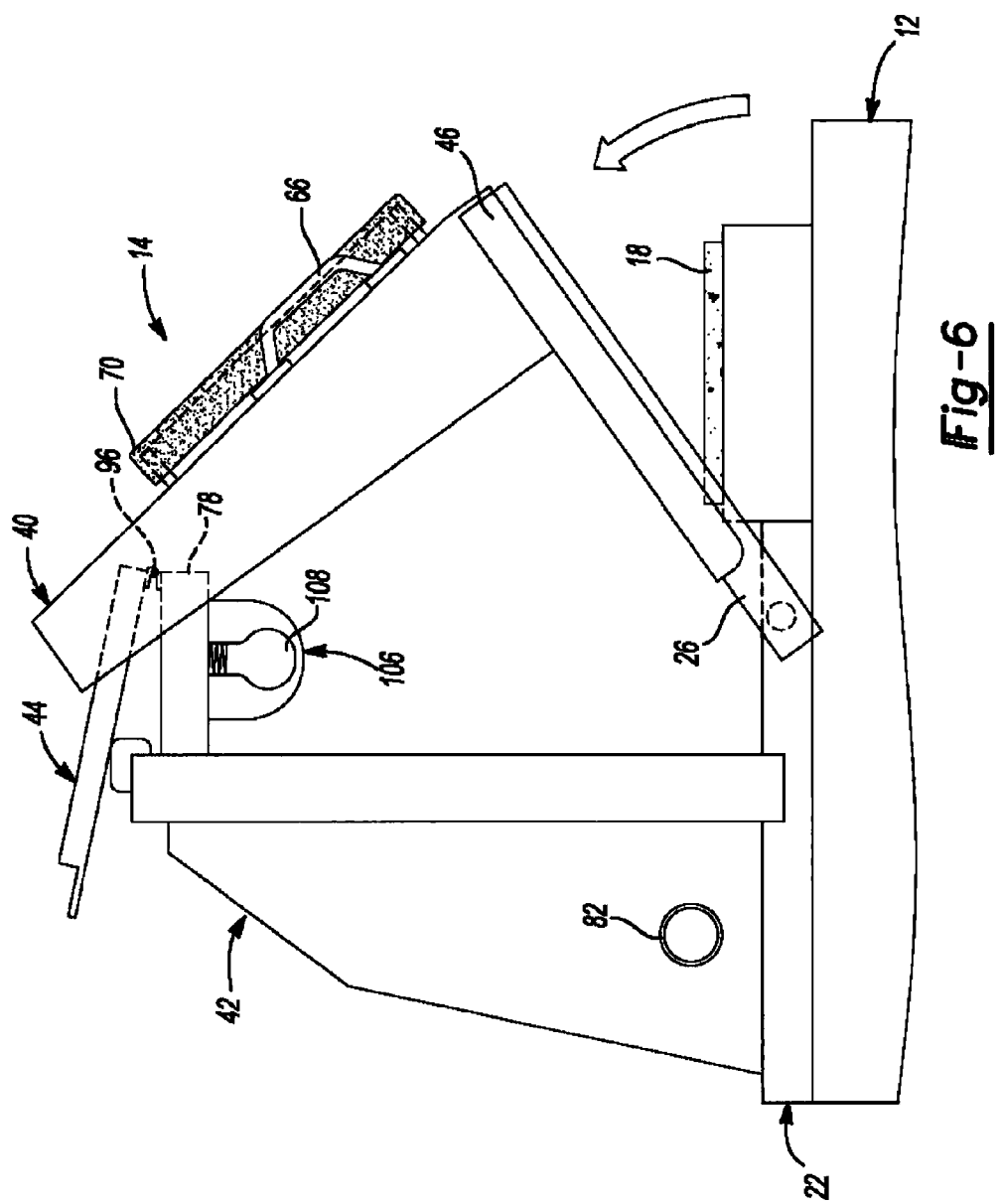
FIG. 6 is a side view of the containment hood including a shell portion in an open position.

The lid portion 44 may include a frame 88 and a window 90. The frame 88 may be formed from aluminum, for example, or from any other metal, polymer or cardboard, and may include an opening 92. The frame 88 may include a first end 94 that is connected to the second top member 78 via a hinge 96. In this manner, the lid portion 44 may be pivotable relative to the first and second shell portions 40, 42 between a closed position (FIGS. 1, 2, and 4) and an open position (FIGS. 5 and 6). A second end 98 of the frame 88 may abut the first top portion 54 of the first shell portion 40. The window 90 may be formed from glass, Plexiglas® or any other translucent or transparent material. The window 90 may be received in a slot 100 in the frame 88 surrounding the opening 92.

The first and second shell portions 40, 42 and the lid portion 44 may cooperate to form an interior volume 101 having first and second access openings 102, 104 disposed on opposing sides of the containment hood 14. One or more users may stand proximate the first and/or second access openings 102, 104 to access the block of material 18 positioned on the cooling surface 24 of the production station 12. In this manner, the two or more users may simultaneously reach into the interior volume 101 through the access openings 102, 104 or a single user may reach into the interior volume 101 through one of the access openings 102, 104 to remove unsintered powder from the sintered portions of the block of material 18.

In some embodiments, one or more light fixtures 106 may be mounted to the second top member 78, for example, and/or any other interior-facing surface of the containment hood 14. The light fixture 106 may include, for example, an electric light bulb 108 that may illuminate the interior volume 101 of the containment hood 14 and the block of material 18

Referring to FIG. 1, in some embodiments, the vacuum device 16 may be a Model CPF-130, C58901-102 (special), manufactured by Micro Air Clean Air Systems and may include an inlet duct 110 and an inlet hose 112. It will be appreciated, however, that the vacuum device 16 could be any other suitable vacuum system or device. The inlet duct 110 may be coupled with the evacuation opening 64 for fluid communication with the interior volume 101. The inlet duct 110 may include a port 114 connected to a first end of the inlet hose 112. A second end of the inlet hose 112 may be coupled to the evacuation port 82 of the second shell portion 42. In this manner, when the vacuum device 16 is operating, gases and/or airborne particulate matter may be drawn out of the containment hood 14 and into the vacuum device 16 via the evacuation opening 64 and the evacuation port.

What is claimed is:

1. A containment hood comprising:
   a first shell portion including a first member and first and second legs, said first member having a first interior-facing surface;
   a second shell portion spaced apart from said first shell portion and including a second interior-facing surface, said first and second interior-facing surfaces opposing each other, said first and second legs extending from said first shell portion toward said second shell portion, said first member and said first and second legs being rotatable relative to said second shell portion between an open position allowing access to a workpiece disposed between the first and second shell portions and a closed position partially enclosing said workpiece and allowing access to said workpiece only through opposing side-access openings that separate said first and second shell portions, said side-access openings separate said first member and said first and second legs from said second shell portion in both of said open and closed positions; and a lid portion extending between and engaging said first and second shell portions, said lid portion cooperating with said first and second shell portions to form at least a partial enclosure defining an interior volume, said lid portion rotatably engaging one of said first and second shell portions and movable relative to said first and second shell portions between a lid open position allowing a user to access said interior volume through a top access opening and a lid closed position preventing access to said interior volume through said top access opening.

2. The containment hood of claim 1, wherein said first shell portion includes an evacuation opening extending therethrough and configured to engage a vacuum device.

3. The containment hood of claim 2, wherein said second shell portion includes an evacuation port extending outwardly therefrom and is in communication with said interior volume, said evacuation port being configured to engage a hose in communication with said vacuum device.

4. The containment hood of claim 1, wherein said first shell portion includes at least one handle.

5. The containment hood of claim 1, wherein said lid portion includes a window.

6. The containment hood of claim 1, further comprising an electric light mounted within said interior volume.

7. The containment hood of claim 1, wherein said first and second shell portions include first and second bases, respectively, that engage a breakout table associated with a laser sintering machine.

8. An apparatus comprising:
a vacuum device;
a breakout table associated with a selective sintering machine, said breakout table including a cooling surface configured to support a block of material after said block of material is subjected to a sintering operation; and
a containment hood mounted to said breakout table and at least partially enclosing said cooling surface, said containment hood including first and second evacuation openings and an opposing side-access openings, said first and second evacuation openings engaging said vacuum device, said first evacuation opening disposed in a first shell portion of said containment hood, said second evacuation opening disposed in a second shell portion of said containment hood, said first shell portion being spaced apart from and rotatable relative to said second shell portion, said first and second shell portions defining said side-access openings allowing a user to access said cooling surface to allow said user to remove unsintered powder from a sintered portion of said block of material.

9. The apparatus of claim 8, wherein said containment hood includes a lid portion rotatably engaging said second shell portion and rotatable relative to said first shell portion and said second shell portion.

10. The apparatus of claim 9, wherein said lid portion includes a window.

11. The apparatus of claim 8, wherein said first and second shell portions and said lid portion cooperate to define said side-access openings.

12. The apparatus of claim 8 , wherein said first shell portion includes at least one handle.

13. The apparatus of claim 8, wherein said containment hood includes an electric light positioned to illuminate said block of material.

14. The apparatus of claim 8, wherein said first shell portion includes first and second legs extending from said first shell portion toward said second shell portion, said first shell portion being rotatable relative to said second shell portion about an axis defined by said first and second legs between an open position allowing access to a workpiece disposed between the first and second shell portions and a closed position partially enclosing said workpiece and allowing access to said workpiece only through opposing side-access openings that separate said first and second shell portions in both of said open and closed positions, said first and second legs being spaced apart from said second shell portion in said open and closed positions.

* * * * *